July 3, 1945.  G. L. DIMMICK  2,379,790
DICHROIC REFLECTOR
Filed March 31, 1942

Inventor
Glenn L. Dimmick
Attorney

Patented July 3, 1945

2,379,790

UNITED STATES PATENT OFFICE 2,379,790

DICHROIC REFLECTOR

Glenn L. Dimmick, Indianapolis, Ind., assignor to Radio Corporation of America, a corporation of Delaware Application March 31, 1942, Serial No. 436,998

5 Claims. (Cl. 88—1)

This invention relates to an improved dichroic reflector and is a continuation in part of my application Serial No. 332,670, filed May 1, 1940, and entitled "Photocell monitor for sound recorders," now Patent No. 2,289,054. The said earlier application disclosed a specific combination of a dichroic reflector with a sound recording apparatus, while the present application pertains to the dichroic reflector per se.

The dichroic reflector is made by coating a transparent medium, such as glass, with alternate layers of transparent material having different indices of refraction and different thicknesses. In the form of the invention disclosed in the said earlier application, the support was of glass, on which was coated a layer of zinc sulphide having a thickness of one-half of the wave length of the light to be transmitted. On this was coated a layer of calcium fluoride having a thickness of one-quarter of the wave length of the light to be transmitted, and on this was a second coating of zinc sulphide having a thickness of one-half of the wave length of the light to be transmitted. The subject matter of the present application is the same but includes an improvement thereon in that one of the materials is modified to secure greater hardness and mechanical resistance in the coatings.

One object of the present invention is to provide an improved dichroic reflector.

Another object of the invention is to provide an improved coating material for a transparent medium for securing selective transmission and reflection of light.

Another object of the invention is to provide an improved sequence of transparent layers on an optical medium which will produce selective transmission and reflection of light.

A specific object of the invention is to provide a device having no appreciable absorption of light but exhibiting maximum transmission (that is, substantially zero reflection) at one wave length, and substantial reflection at another wave length.

Other and incidental objects of the invention will be apparent to those skilled in the art from a reading of the following specification and an inspection of the accompanying drawings, in which.

Figure 1:
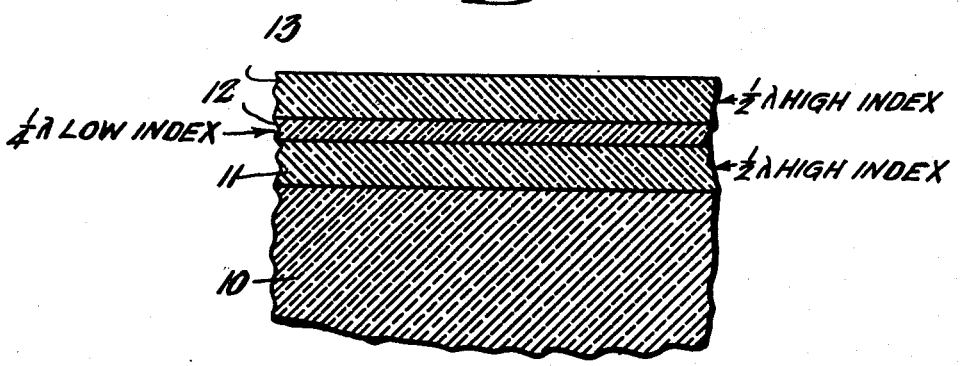
Figure 1 is a greatly enlarged sectional view of an optical element having the improved selectively reflective coating thereon.

In the drawing, the optical medium which is indicated at 10, may be of glass or other transparent material or, if it is not desired to use the transmitted light, it may be of appropriate opaque or light absorbing material such, for example, as metal with a black nickel finish thereon.

On the surface of the support 10 there is deposited by evaporation a layer 11 of material having a high index of refraction, preferably zinc sulphide, having a thickness of one-half of the wave length of the light which is to be selectively transmitted. On this there is then deposited a layer 12 of calcium fluoride or other low index material having a thickness of one-quarter of the wave length of the light which is to be transmitted, and on this surface there is deposited a third layer 13 similar to the first layer 11, of zinc sulphide, for example, and having a thickness of one-half of the wave length of the light which is to be selectively transmitted.

Figure 2A:
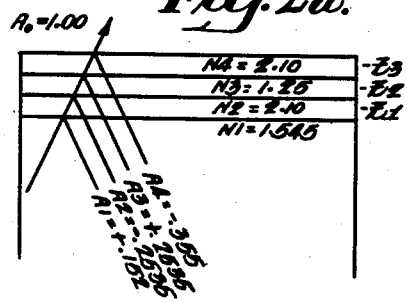
Figures 2a to 3b are vector diagrams showing the theory involved.

This structure was described in my earlier application of which this is a continuation in part, although the theory of its operation was not there described. I have described the application of the graphical method of analysis to thin optical films in my paper entitled "A new dichroic reflector and its application to photocell monitoring systems" appearing in the Journal of the Society of Motion Picture Engineers, vol. XXXVIII, January 1942, at pages 36 to 44. It is unnecessary to here repeat that paper, but the operation of my improved multilayer film may be explained by the graphical method of analysis as follows:

Fig. 2a corresponds generally to Fig. 1, but is on a much smaller scale and indicates as an arrow $A_0$, a ray of light passing through the films $t1$, $t2$, $t3$, and the location of the various vector values involved.

The deciding factor in choosing values for $N_2$, $N_3$ and $N_4$ (Fig. 2a) is that materials are available that have these indices of refraction. In order to obtain the greatest peak transmission at one wave length and the greatest peak reflection at another wave length, it is necessary so to arrange the films that the algebraic sum of the four reflected amplitudes is as great as possible and that the algebraic sum of a group of amplitudes which are given one sign in accordance with the considerations hereinafter set forth is equal to the sum of the remaining amplitudes. The first condition is obtained at one wave length by placing the high-index film on the outside in contact with the air, because the total resulting reflection from all four surfaces is then at a maximum. When the glass plate is made to have an index of refraction of 1.545, the second condition is also met at another wave length; this is because when regard is had to the index of the support 10 and the indices and thicknesses of the three films, the reflected amplitudes which have one phase or sign, in accordance with the considerations hereinafter set forth, are substantially equal in magnitude to the reflected amplitudes which have the opposite phase or sign, and the resultant reflection is therefore at a minimum. In other words, $A1+A2+A3+A4$ is greater than for any other possible arrangements of the three films, and $A1+A4=A2+A3$.

Figure 2B:

Fig. 2b shows the arrangement of the vectors when the thickness of all films approaches zero. The vectors resulting from light reflected in passing from a medium of higher to a medium of lower index are given one sign. The vectors resulting from light reflected in passing from a medium of lower to a medium of higher index are given the opposite sign. The reason for this is that a phase reversal of the reflected beam takes place when light passes from a dense to a rare medium but there is no phase change when it passes from a rare to a dense medium. It is preferred to give the stationary vector $A1$ a positive sign and let the above considerations determine the signs of the other vectors.

Figure 2C:

Fig. 2c shows the necessary arrangement of the vectors at 4400 A if the transmission is to be maximum. Comparison of Figs. 2b and 2c show that vector $A2$ has been rotated through $2\pi$ radians, or an even multiple of this angle. Since the optical thickness $N1t1 = \theta\lambda/4\pi$ it follows that the minimum thickness of the first film is $\lambda/2$. Again comparing Fig. 2b and Fig. 2c it is evident that vector $A3$ has been rotated through an odd multiple of $\pi$ radians. But the first film has already caused $A3$ to rotate through $2\pi$ radians. The first odd multiple will then be $3\pi$ radians, and this makes the optical thickness of the first two layers $3\lambda/4$ and the optical thickness of the second layer $\lambda/4$. A final comparison of Fig. 2b and Fig. 2c shows that vector $A4$ has been rotated through an odd multiple of $\pi$ radians. The first two films have already rotated $A4$ through $3\pi$ radians, so the first odd multiple will be $5\pi$ radians. This corresponds to an optical thickness of $5\lambda/4$ for all three films or $\lambda/2$ for the third film. This completes the design of the three-layer selective reflector.

To find out whether this reflector meets our requirements, we lay out the positions of the four vectors for several different wave lengths and find the resultant amplitude in each case. The square of the resultant amplitude gives us the reflected intensity for the wave length in question.

Figure 3A:
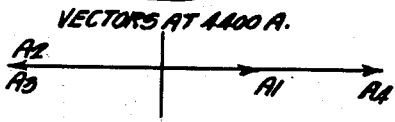
Figure 3c is a curve showing the reflectivity of one form of the film.
Figure 3B:
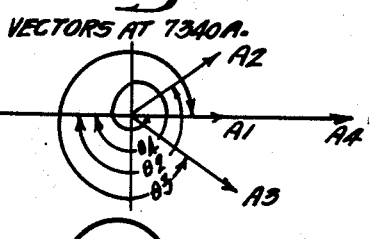

Fig. 3a shows the position of the four vectors for a wave length of 4400 A and Fig. 3b shows their position for a wave length of 7340 A. The angular positions $\theta2$, $\theta3$ and $\theta4$ of the vectors $A2$, $A3$ and $A4$ (Fig. 3b) are determined for any wave length by the formulas $$\theta2 = \frac{4400}{\lambda} \times 360°$$

$$\theta3 = \frac{4400}{\lambda} \times 540°$$

$$\theta4 = \frac{4400}{\lambda} \times 900°$$

where $\lambda$ is the wave length in question and $\theta$ is the angle of a particular vector as measured from its position shown in Fig. 2b. This is the position when the film thicknesses approach zero, but it also represents the position when the wave length approaches infinity.

Figure 3C:
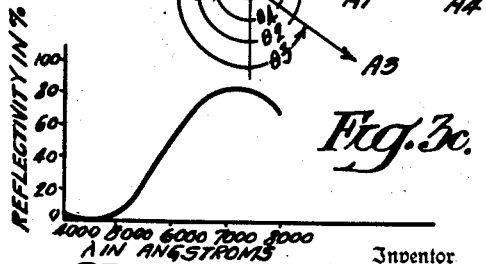

Fig. 3c shows a curve of reflectivity vs. wave length for the three-layer selective reflector (Fig. 2a) as determined by the graphical method. According to this curve the transmission of the reflector is 100 percent at 4400 A and the reflectivity is 84 percent at 7340 A. Because of the assumptions that have been made, it is not to be expected that the actual reflector will reach values quite as high as indicated above. Measurements were taken on many reflectors made to the above specifications. These showed that the transmission is 95 percent, when measured with a filter and photocell having the same color characteristics as positive film. The reflectivity as measured through a Wratten A filter is 65 percent.

In the improved form of the invention, the layer 12, instead of being composed of calcium fluoride, is composed of an evaporation product of a mixture of 90% calcium fluoride and 10% aluminum oxide, as described and claimed in my application Serial No. 348,815, filed July 31, 1940; or it may be composed of the mineral Gearksutite, which is a natural calcium aluminum oxy-fluoride, as described and claimed in my application Serial No. 408,807, filed August 29, 1941. However, the material I prefer to use is the artificial Gearksutite, or evaporation product of a eutectic mixture of calcium fluoride and aluminum fluoride containing a small percentage of aluminum oxide, as described and claimed in my application Serial No. 432,836, filed February 28, 1942. Each of these materials produces a film which is materially harder and much less easily scratched or damaged than the coating first described using pure calcium fluoride. The coating of the calcium fluoride-aluminum fluoride eutectic has the most desirable properties from the optical and mechanical standpoints, and therefore is the type of coating which I prefer to use.

I claim as my invention:

1. A dichroic reflector comprising a transparent support, a transparent layer on a surface of said support having an effective optical thickness of one-half of the wave length of light to be transmitted by said support and an index of refraction higher than that of said support, a second transparent layer superimposed on said first layer and having an effective optical thickness of one-quarter of said wave length and an index of refraction lower than that of said first layer, and a third transparent layer superimposed on said second layer and equal in thickness and index to said first layer, the indices of refraction of said support and said layers being such that the algebraic sum of the amplitudes of light reflected from said surface and the surfaces of said layers, having regard to their phase, is substantially zero at one wave length and substantially a maximum at another wave length.

2. A reflector according to claim 1, in which said first and third layers are composed of zinc sulphide.

3. A reflector according to claim 1, in which said second layer is composed of a metallic fluoride.

4. A reflector according to claim 1, in which said second layer is composed of the eutectic mixture of calcium fluoride and aluminum fluoride.

5. A dichroic reflector comprising a transparent support of glass having an index of refraction of approximately 1.5, a transparent layer of zinc sulphide on a surface of said support having an effective optical thickness of one-half the wave length of light to be transmitted by said support, a transparent layer of a eutectic mixture of calcium fluoride-aluminum fluoride superimposed on said first layer and having an effective optical thickness of one-quarter of said wave length and a transparent layer of zinc sulphide superimposed on said second layer and having an effective optical thickness of one-half of said wave length.

GLENN L. DIMMICK.